(12) United States Patent
Lang et al.

(10) Patent No.: US 10,627,589 B2
(45) Date of Patent: Apr. 21, 2020

(54) OPTICAL CABLE FOR TERRESTRIAL NETWORKS

(71) Applicant: Prysmian S.p.A., Milan (IT)

(72) Inventors: Ian Dewi Lang, Milan (IT); Lee Anthony Spicer, Milan (IT); Martin Vincent Davies, Milan (IT)

(73) Assignee: PRYSMIAN S.p.A., Milan (IT)

( * ) Notice: Subject to any disclaimer, the term of this patent is extended or adjusted under 35 U.S.C. 154(b) by 0 days.

(21) Appl. No.: 15/575,712

(22) PCT Filed: May 28, 2015

(86) PCT No.: PCT/EP2015/061800
§ 371 (c)(1),
(2) Date: Nov. 20, 2017

(87) PCT Pub. No.: WO2016/188576
PCT Pub. Date: Dec. 1, 2016

(65) Prior Publication Data
US 2018/0292625 A1    Oct. 11, 2018

(51) Int. Cl.
*G02B 6/44* (2006.01)

(52) U.S. Cl.
CPC .............. *G02B 6/443* (2013.01); *G02B 6/441* (2013.01); *G02B 6/4486* (2013.01); *G02B 6/4494* (2013.01); *G02B 6/4433* (2013.01); *G02B 6/4434* (2013.01); *G02B 6/4484* (2013.01); *G02B 6/4495* (2013.01)

(58) Field of Classification Search
CPC .... G02B 6/441; G02B 6/4411; G02B 6/4413; G02B 6/4414
See application file for complete search history.

(56) References Cited

U.S. PATENT DOCUMENTS

| T958,010 I4 | * | 5/1977 | Eichenbaum ...... G02B 6/02395 385/141 |
| 4,659,174 A | | 4/1987 | Ditscheid et al. |
| 5,751,879 A | * | 5/1998 | Graham ................ G02B 6/441 174/107 |
| 6,400,873 B1 | | 6/2002 | Gimblet et al. |
| 9,323,019 B1 | * | 4/2016 | Goddard ............. G02B 6/4434 |

(Continued)

FOREIGN PATENT DOCUMENTS

| EP | 0 256 704 | 2/1988 |
| EP | 0 477 416 A1 | 4/1992 |

(Continued)

OTHER PUBLICATIONS

Ishida et al., Machine Translation of JP 58-011909 A, Jan. 1983. (Year: 1983).*
"Optical fibre cables—Part 1-22: Generic specification—Basic optical cable test procedures—Environmental test methods", BSI Standards Publication, BS EN 60794-1-22: 32 pages, Aug. 2012.
"Optical fibre cables—Part 1-23: Generic specification—Basic optical cable test procedures—Cable element test methods", BSI Standards Publication, BS EN 60794-1-23: 20 pages, Oct. 2012.

(Continued)

*Primary Examiner* — Michelle R Connelly
(74) *Attorney, Agent, or Firm* — Finnegan, Henderson, Farabow, Garrett & Dunner, L.L.P.

(57) ABSTRACT

An optical cable includes an optical module which includes a strength member, a plurality of optical fibers arranged about the strength member, the optical fibers being arranged substantially on a circumference concentric with the strength member, and a retaining element arranged about the plurality of optical fibers.

17 Claims, 7 Drawing Sheets

(56) References Cited

U.S. PATENT DOCUMENTS

| | | | | |
|---|---|---|---|---|
| 2005/0013566 A1* | 1/2005 | Storaasli | ............... | G02B 6/504 385/113 |
| 2005/0196113 A1* | 9/2005 | Hurley | .................. | G02B 6/441 385/109 |
| 2011/0110636 A1* | 5/2011 | Nave | .................... | G02B 6/4432 385/103 |

FOREIGN PATENT DOCUMENTS

| | | | | |
|---|---|---|---|---|
| EP | 0 833 177 | | 4/1998 | |
| EP | 1 043 733 61 | | 10/2000 | |
| EP | 1 116 244 B1 | | 7/2001 | |
| EP | 1 324 090 | | 7/2003 | |
| JP | 58011909 A | * | 1/1983 | ............ G02B 6/441 |
| WO | WO 01/09659 | | 2/2001 | |
| WO | WO 01/75499 A2 | | 10/2001 | |

OTHER PUBLICATIONS

"Optical Fiber Cable Color Coding", TIA Advancing Global Communications, TIA Standard, ANSI/TIA-598-D, 28 pages, Jul. 2014.
International Search Report form the European Patent Office in corresponding International Application No. PCT/EP2015/061800 dated Apr. 19, 2016.
Written Opinion of the International Searching Authority from the European Patent Office in corresponding International Application No. PCT/EP2015/061800, dated Apr. 19, 2016.
Communication from the EPO in counterpart application No. 15 727 3459.9, dated Nov. 29, 2108.
Machine translation of EP 0 477 416 A1.
European Office Action dated Sep. 24, 2019, from the European Patent Office, in counterpart European Application No. 15 727 345.9.

* cited by examiner

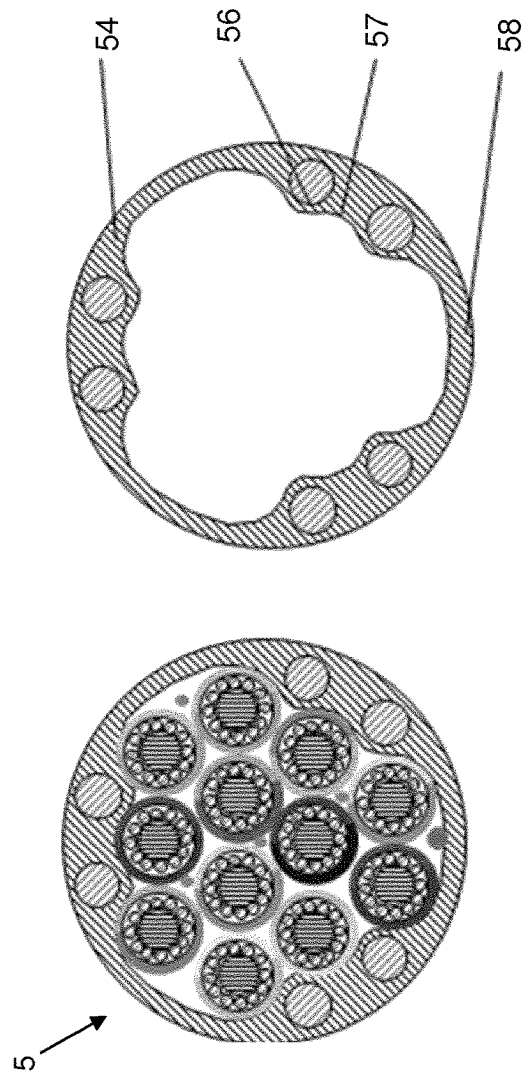
Fig. 5b
Fig. 5a
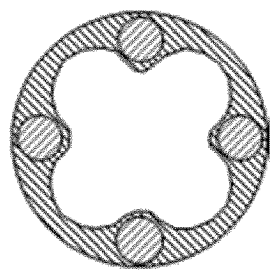
Fig. 6b
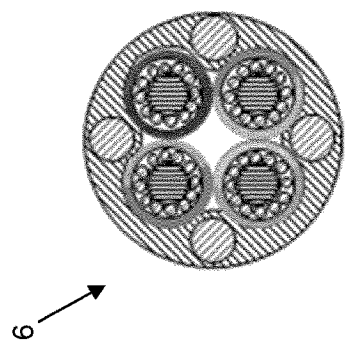
Fig. 6a

OPTICAL CABLE FOR TERRESTRIAL NETWORKS

CROSS REFERENCE TO RELATED APPLICATION

This application is a national phase application based on PCT/EP2015/061800, filed May 28, 2015, the content of which is incorporated herein by reference.

TECHNICAL FIELD

The present invention relates to the field of optical cables. More particularly, the present invention relates to an optical cable comprising an optical module, the cable being suitable for terrestrial networks, in particular—but not exclusively—optical access networks for FTTX applications (wherein FTTX means fiber to the X, where X can be home, cabinet, curb, or the like).

BACKGROUND ART

As known, an optical cable typically comprises an optical core and an external sheath enclosing the optical core. The external sheath is typically made of a polymeric material and has the primary function of protecting the optical core from the mechanical stresses.

The optical core of these type of cables typically comprises one or more optical modules, the term "optical module" indicating a fiber bundle—comprising one or more optical fibers—and a retaining element (e.g. a buffer tube or a tape) surrounding the optical fibers. The retaining element carries out the function of retaining the optical fibers and, optionally, protecting them against mechanical stresses.

An optical fiber is typically constituted by a glass core, a glass cladding and a single or dual coating layer.

The optical fibers may be arranged in various ways within the cable.

For instance, the so called "multi-loose tube cables" (briefly, MLT cables) typically comprise multiple optical modules (e.g. 3, 4, 6 or more optical modules), each module typically grouping a number of optical fibers in a buffering tube. The buffering tubes, typically made of a polymeric material (e.g. polybutylene terephthalate—PBT), are stranded about a central strength member, which is usually made of compacted steel strand or "glass reinforced plastic" (briefly, GRP). A binder or tape may also be provided around the optical modules for retaining them. The external sheath surrounds all the optical modules to provide environmental protection.

In MLT cables, the loads to which the cable is subject (tensile loads, bend loads, environmental loads) are mainly withstood by the central strength member and, optionally, by peripheral strength members arranged about the optical modules.

Besides MLT cables, other arrangements for optical fiber cables are known.

For instance, U.S. Pat. No. 4,659,174 discloses an optical cable element including an optical waveguide loosely embedded in a bundle of strength fibers, and a protective mantle surrounding the waveguide-containing bundle of strength fibers. The optical waveguides and the strength fibers surrounding them fill 50% to 90% of the space inside the mantle.

EP 1 324 090 discloses a central tube cable comprising buffer tubes housing optical fibers, the tubes being stranded around a bundle support member. The cable further comprises a cable jacket with strength members embedded therein.

EP 0 256 704 discloses an optical fiber cable comprising an outer sheath, four or five strength members and at least one optical fiber package accommodated in an interstitial space formed by the strength members.

SUMMARY OF THE INVENTION

The inventors have noticed that a MLT cable exhibits some drawbacks. First of all, the presence of the central strength member disadvantageously increases the overall cross-sectional diameter of the cable. Moreover, the relatively large diameter of the strength member also increases the minimum bend diameter of the cable.

Further, as known, the stiffness of the strength member and the cable weight influence the loads required to install the cable and hence the installation length. Typically, given a maximum tensile strength, the larger the cable, the heavier the cable and the shorter the installation length. Moreover, the stiffer the cable, the greater the load required to install it (in particular, if the cable route comprises a corner). Therefore, the presence of the central strength member disadvantageously reduces the installation length of the cable.

Furthermore, the buffering tubes of a MLT cable have little inherent stiffness or tensile strength, with the exception of that afforded by the fibers. This may result in module damage. This limit is typically evaluated by product testing, for example, by testing the module kink performance by IEC 60794-1-23 method G1. Due to these shortcomings, typically, these modules are bend managed within a connectivity equipment (e.g. underground joint, termination rack) using external devices including capstans, pulleys, transport tubes and curved surfaces. All such bend management devices add costs to the system.

Besides, the inventors noticed that also the optical cable element of U.S. Pat. No. 4,659,174 exhibits some drawbacks.

In particular, in the cable of U.S. Pat. No. 4,659,174 the use of strength fibers provides the optical cable element with poor compressive strength and poor structural rigidity, which does not allow to provide controlled resistance to bend.

Moreover, in the cable of EP 1 324 090, the bundle support member entails drawbacks similar to those already cited above with reference to the central strength member of a MLT cable, especially in terms of large cable size.

Further, as far as the cable of EP 0 256 704 is concerned, the alleged advantage of this cable construction is improved tensile strength. However, this cable exhibits other disadvantages such as a relatively large cable size and a high bend resistance.

In view of the above, the Applicant has tackled the problem of providing an optical cable for terrestrial networks (in particular, but not exclusively, FTTX networks) comprising an optical module, which overcomes at least one of the aforesaid drawbacks.

In particular, the Applicant has tackled the problem of providing an optical cable for terrestrial networks comprising an optical module, which allows providing cables with a reduced size and an improved tensile strength with respect to known cables, and which, at the same time, allows reducing the minimum bend diameter of the cable and allows providing a longer installation length.

The Applicant found that the above problem is solved by an optical cable comprising an optical module with a strength member, a number of optical fibers stranded around the strength member and a retaining element surrounding the optical fibers. The optical cable of the invention advantageously has a reduced diameter in comparison to known cables comprising a same number of optical fibers. This allows designing compact cables for FTTX applications. In particular, the optical cable of the invention may not need any central strength member since the tensile strength is conferred to the cable by the optical modules, in particular by the strength members thereof. The fact that the cable according to the present invention does not need any central strength member provides a reduced minimum bend diameter and a longer cable installation length.

Moreover, the number of optical fibers is selected so that the optical fibers are uniquely identifiable by a color code. The color code may be compliant with the optical fiber cable color coding defined by the standard ANSI/EIA/TIA-598 "Optical Fiber Color Coding".

Furthermore, the optical module of the optical cable of the invention may be manufactured in an easy and economically effective way.

In one aspect, the present invention relates to an optical cable comprising an optical module, the optical module comprising a strength member, a plurality of optical fibers arranged about the strength member wherein the optical fibers are arranged substantially on a circumference concentric with the strength member and a retaining element arranged about the plurality of optical fibers.

Preferably, the strength member is a rod made of a glass reinforced plastic (GRP).

More preferably, the rod is made of a GRP having a Young's modulus comprised between 25 MPa and 125 MPa.

Preferably, the strength member has a diameter comprised between 0.55 mm and 0.95 mm, preferably 0.75 mm.

Preferably, the strength member is covered by a coating, preferably made of a water swellable material or an EVA copolymer.

Preferably, the retaining element is a tube arranged externally coaxial to the strength member.

Preferably, the retaining element is made of a single polymeric material.

More preferably, the retaining element is made of a single polymeric material selected in the group comprising: polybutylene terephthalate (PBT), polypropylene (PP), polyethylene (PE), polyamide (PA), polycarbonate (PC), acrylonitrile butadiene styrene (ABS), thermoplastic elastomers (TPE), ethylene vinyl acetate (EVA), UV cured acrylics.

Alternatively, the retaining element comprises two first longitudinally extending portions made of a first, higher fracture toughness material and one or two second longitudinally extending portions made of a second, lower fracture toughness material in order to facilitate access to the underlying fibers. Preferably, the first, higher fracture toughness material of the retaining element is a mixture of HDPE (polyethylene high-density) and PP (polypropylene).

Preferably, the second, lower fracture toughness material of the retaining element comprises a LDPE (polyethylene low-density) compound.

Preferably, the outside diameter of the retaining element is comprised between 0.6 mm and 2.2. mm.

Preferably, the fibers are arranged side by side on said circumference, with no reciprocal overlapping.

Preferably, the optical module further comprises a further coating arranged on the inside surface of the retaining element.

Preferably, the optical module further comprises, in an interstitial space between the strength member and the retaining element, a water blocking material and/or a buffering grease.

In another aspect, the present invention relates to a process for manufacturing an optical cable comprising:

stranding a group of optical fibers around a strength member and covering the fibers with a retaining element; thereby forming an optical module;

housing two or more optical modules within an outer sheath.

BRIEF DESCRIPTION OF THE DRAWINGS

The present invention will become fully clear by reading the following detailed description, to be read by referring to the accompanying drawings, wherein:

FIGS. 5a and 5b show, respectively, a cable comprising a plurality of optical modules according to an alternative embodiment of the present invention and an outer sheath thereof;

FIGS. 6a and 6b show, respectively, a cable comprising four optical modules according to an alternative embodiment of the present invention and an outer sheath thereof;

DETAILED DESCRIPTION OF PREFERRED EMBODIMENTS OF THE INVENTION

For the purpose of the present description and of the appended claims, except where otherwise indicated, all numbers expressing amounts, quantities, percentages, and so forth, are to be understood as being modified in all instances by the term "about". Also, all ranges include any combination of the maximum and minimum points disclosed and include any intermediate ranges therein, which may or may not be specifically enumerated herein.

Figure 1A:
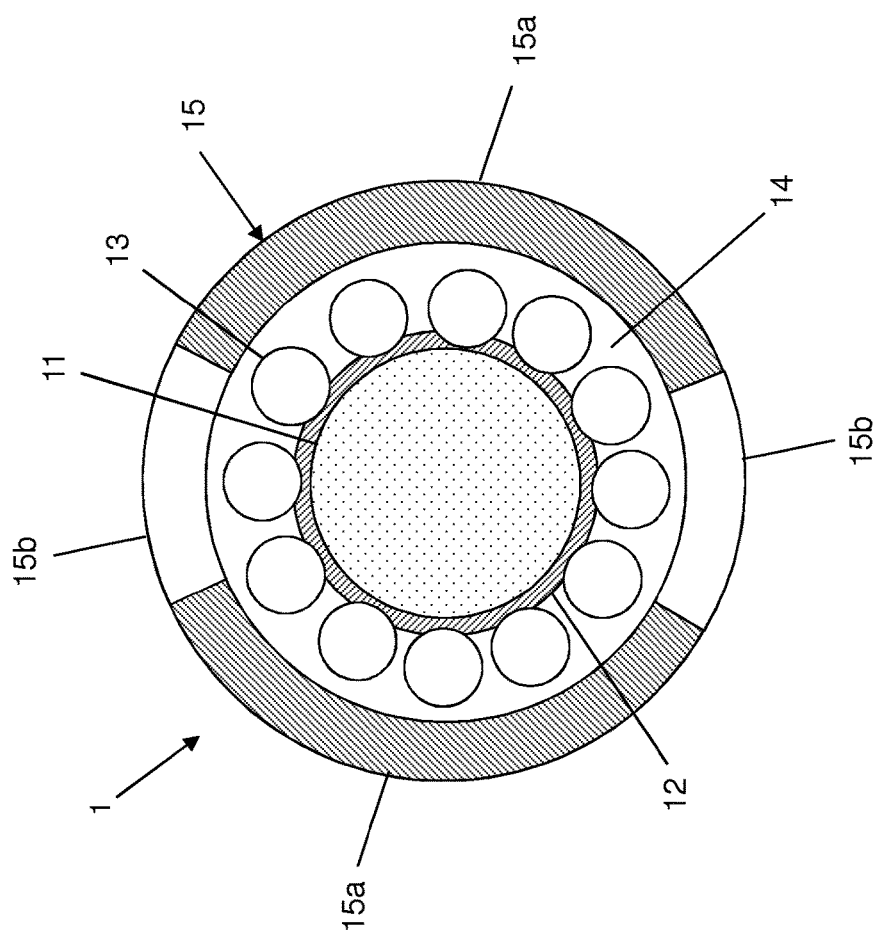
FIG. 1a schematically shows an optical module according to a further embodiment of the present invention where the retaining element comprises two different longitudinally extending portions.
Figure 1:
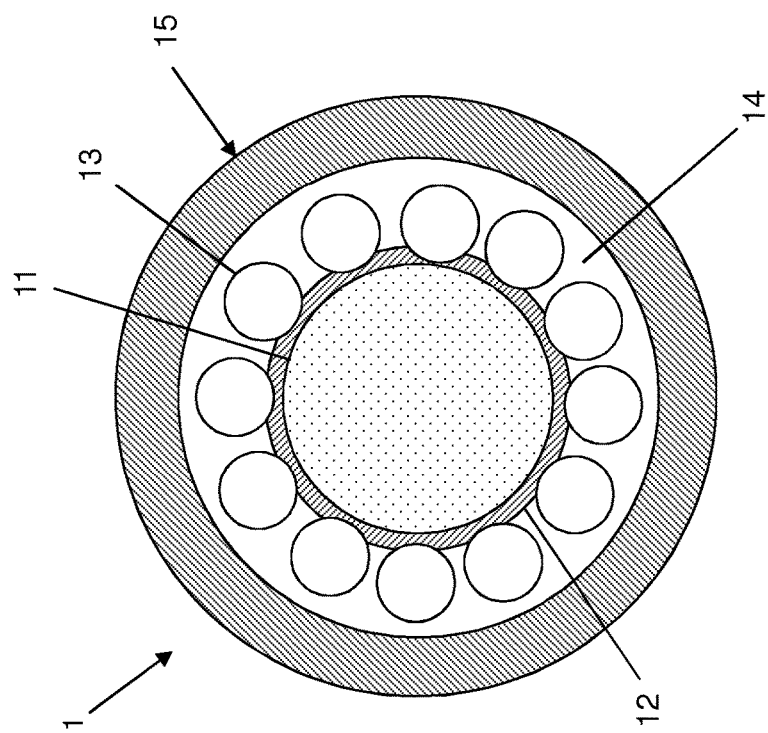
FIG. 1 schematically shows an optical module according to an embodiment of the present invention.

FIG. 1 shows an optical module 1 according to an embodiment of the present invention.

The optical module 1 comprises a strength member 11, optionally covered by a coating 12.

The strength member 11 is preferably in the form of a rod. Preferably, the rod is made of a glass reinforced plastic (GRP). More preferably, the rod is made of a GRP having a Young's modulus comprised between 25 MPa and 125 MPa. Even more preferably, the Young's modulus of the GRP is equal to 50 MPa. The strength member 11 has preferably a diameter which is comprised between 0.55 mm and 0.95 mm, preferably corresponding to 0.75 mm.

The coating 12 is made, for instance, of a thermoplastic resin sheathing and/or water swellable material.

The coating has an elastic modulus (at room temperature) preferably comprised between 10 and 300 kPa, more preferably between 20 and 60 kPA; preferably, the coating has a hardness comprised between 0 and 90 Shore 00, preferably below 20 Shore 00.

Advantageously, the coating 12 applied on the strength member 11 allows protecting the optical fibers from mechanical stresses and bedding the fibers such they maintain position during the stranding processing.

When the coating 12 is made of a water swellable material, it allows also to prevent longitudinal water diffusion.

The Applicant has made positive tests using an assembly of a strength member 11 with a coating 12, supplied as Water Swellable Glassline™ from Tecniconsult S.p.A.

Alternatively, the coating 12 may be made, for instance, of EVA (ethylene vinyl acetate) copolymer material.

The size of the GRP portion of the strength member is preferably defined in view of the tensile load to be carried by the optical module.

The thickness of the coating 12 is thereafter chosen in order to provide the required water swelling capability and/or to reach an overall diameter enabling to arrange the required number of fibers therearound in a single layer.

The diameter of the strength member 11 as covered by the coating 12 is preferably comprised between 0.25 mm and 1.9 mm. More preferably, such diameter is equal to 0.85 mm.

The optical module 1 further comprises a retaining element 15, preferably in the form of a tube, which is arranged externally to the strength member 11 in a coaxial way. This way, an annular space is formed between the strength member 11 and the retaining element 15.

More preferably, the retaining element 15 is in the form of a polymeric tube. Preferably, the polymeric material of the retaining element 15 is polybutylene terephthalate (PBT) or an alloy of polyethylene (PE) and polypropylene (PP). Other exemplary polymeric materials which may be employed are: polyethylene (PE), polyamide (PA), polycarbonate (PC), acrylonitrile butadiene styrene (ABS), thermoplastic elastomers (TPE), ethylene vinyl acetate (EVA), UV cured acrylics. Preferably, the retaining element 15 allows identifying the optical module 1 by means of a color code. The color of the retaining element 15 is preferably compliant with the already mentioned optical fiber cable color coding defined by the standard ANSI/EIA/TIA-598 "Optical Fiber Color Coding".

According to embodiments of the present invention, the retaining element 15 is made of a single material from the above listed polymeric materials.

According to alternative embodiments shown in the example of FIG. 1a, the retaining element 15 comprises two first longitudinally extending portions 15a made of a first, higher fracture toughness material and two second longitudinally extending portions 15b made of a second, lower fracture toughness material in order to facilitate the access to the underlying optical fibers.

The two materials are arranged so that the optical fibers can be accessed from outside with a short longitudinal cut (namely, a few centimeters), made with a blade in the second, lower fracture toughness material. The cut edges of the second, lower fracture toughness material can be pulled apart by hand. The pulling force causes the lower fracture toughness material to fracture, thereby propagating the initial short cut longitudinally along the retaining element through its whole thickness.

In this way, very long portions (namely, several meters) of retaining element may be easily removed from the cable with a minimum risk of injuries to the operator or damages to the cable. The blade is indeed used for making only a very short initial cut, which is then propagated along the cable for the desired length by hand (namely, without the use of any blade) and hence in a very safe way.

In alternative, one or two longitudinal grooves may be made in the retaining element (made of a single material or of two different materials).

Using two different retaining element materials instead of the grooves for easing retaining element removal may be advantageous when the retaining element is thin, so that, by suitably choosing the hardness of the two materials, it remains mechanically stable and capable of preserving its integrity also when the cable is bent or twisted.

Each one of the first portions and second portions has a transversal cross-section in the shape of a sector of annulus.

The angular width of the two first portions 15a is preferably higher than the angular width of the second portions 15b. In particular, the angular width of each first portion 15a is preferably higher than 90°, whereas the angular width of each second portion 15b is preferably lower than 90°. More preferably, the angular width of each first portion 15a is comprised between 110° and 140°, whereas the angular width of each second portion 15b is comprised between 40° and 70°.

Preferably, the angular width of each of the two first portions 15a is the same. Preferably, the angular width of each of the two second portions 15b is the same.

The first portions 15a are preferably placed at diametrically opposed positions, and also the second portions 15b are preferably placed at diametrically opposed positions. According to these embodiments, at least one of the second portions 15b may exhibit an optional groove or notch (not shown). Such groove may optionally be provided with an identification stripe and/or ink-jet printed identification codes allowing identification of the optical module 1.

According to these embodiments, the first, higher fracture toughness material and the second, lower fracture toughness material are selected so that the ratio between the fracture toughness $K_{IC}$ of the first material and the fracture toughness $K_{IC}$ of the second material is higher than 1.2. Further, the ratio between the fracture toughness $K_{IC}$ of the first material and the fracture toughness $K_{IC}$ of the second material is preferably lower than 7.5. More preferably, the ratio between the fracture toughness $K_{IC}$ of the first material and the fracture toughness $K_{IC}$ of the second material is comprised between 3.0 and 4.0. In particular, the first material preferably has a fracture toughness $K_{IC}$ comprised between 0.9 and 2.8 MPa $\sqrt{m}$, whereas the second material has a fracture toughness $K_{IC}$ comprised between 0.4 and 0.7 MPa $\sqrt{m}$.

The first and second materials are preferably compatible from the mechanical point of view, in particular they exhibit substantially the same hardness and properties of reciprocal adhesion.

Preferably, the first and second materials are different compounds comprising a common polymer, e.g. polyethylene. In addition to such polymer, the first material comprises a further polymer effective for increasing its fracture resistance, e.g. polypropylene. This provides a strong and continuous bond between all the sectors, thereby providing the retaining element 15 with mechanical stability and improving its mechanical protection performance.

Preferably, the first and second materials have different colors, in order to allow visual identification of the second portions from outside the optical module. Optionally, at least one of the first material and the second material may be a transparent or translucent material, which allows the inner structure of the optical module 1 to be partially visible from outside the optical module 1.

The Applicant made positive tests using, as first material, a mixture of HDPE (polyethylene high-density) and PP (polypropylene) and, as second material, LDPE (polyethylene low-density). More particularly, a positive test has been made using, as first material, a mixture of 20% HDPE (Borealis 6063), 78% PP (Repsol Isplen® PB 140 G2M) and 2% black colorant and, as second material, a mixture of 98% LDPE (Borealis 8706) and 2% green colorant.

According to further alternative embodiments, the retaining element 15 comprises a first longitudinally extending section made of a first, opaque material and a second longitudinally extending section made of a second, non opaque material. The non-opaque may be a transparent or translucent material. Preferably, both the opaque material and the non opaque material of the retaining element 15 are polymer materials, more preferably polymer materials comprising polyethylene. According to these embodiments, the non opaque section may exhibit an optional groove or notch. The groove in the non opaque section advantageously eases removal of the retaining element 15 from the optical module 1. Moreover, the non opaque section constitutes a longitudinal narrow window allowing visual inspection of the module inner structure. Optionally, the non opaque material of the second section has a lower fracture toughness than the opaque material of the first section. This further eases the operation of removing the retaining element 15 from the optical module 1.

The thickness of the retaining element 15 is preferably equal to 0.15 mm. The outside diameter of the retaining element 15 (which corresponds to the diameter of the whole optical module 1) is preferably comprised between 0.6 mm and 2.2. mm, and is more preferably equal to 1.65 mm.

The optical module 1 further comprises a number of optical fibers 13 arranged within the annular space formed between the retaining element 15 and the strength member 11. Preferably, the optical fibers 13 are stranded about the strength member 11 optionally covered by the coating 12 avoiding cross-over or multiple cross-over between the fibers.

The optical fibers 13 are preferably arranged about the strength member 11 according to an S-Z arrangement. Other arrangements are possible, such as, e.g. an helical arrangement or a straight lay arrangement. Preferably, the fibers 13 form a single layer of fibers over the strength member 11 arranged on a single circumference concentric with the strength member 11. The fibers 13 are preferably arranged side by side, with no reciprocal overlapping. This minimizes the signal attenuation occurring in case the optical module 1 is subjected to radial load.

The optical fibers 13 may be at least partly embedded within the coating 12.

The number of optical fibers 13 is preferably selected so that each fiber 13 is uniquely identifiable. For instance, the fiber identification may be based on the color codes defined by the above mentioned international standard ANSI/EIA/TIA-598. In this case, the optical fibers 13 are at most twelve (if no tracers are used) or twenty-four (if tracers are used).

According to an example, the optical module 1 shown in FIG. 1 comprises twelve fibers 13 arranged around the strength member 11 optionally covered by the coating 12.

Preferably, the optical fibers 13 are coated with a barrier material, for instance talcum powder.

According to variants of the present invention, the interstitial space between the optical fibers 13 and the inside surface of the retaining element 15 may be filled by a water blocking material such as a water swellable material (e.g. polyacrylate), in the form of powder, tapes or impregnated yarns.

According to a further variant of the present invention, the optical module 1 comprises, in addition to the coating 12 arranged on the outside surface of the strength member 11, a further coating arranged on the inside surface of the retaining element 15. These two coatings may be made of a water swellable material or an EVA copolymer. Preferably, the material of the coating 12 and of the further coating is selected such that they deform without exerting excessive compressive force on the fiber. For example, a suitable material for the further coating comprises a thermoplastic resin material. In this way, the coatings advantageously buffer the optical fibers 13 from external mechanical loads.

According to a still further variant of the present invention, the interstitial space between the outside surface of the strength member 11 and the inside surface of the retaining element 15 is filled with a buffering grease (e.g. a synthetic thixotropic gel). This material advantageously buffers the optical fibers 13 from transient loads. Moreover, it carries out a longitudinally water blocking function. The inventors have made positive tests using a filling compound based on non-sticky, hydrophobic, preferably thixotropic compound. For example the gel 400N by Unigel (UK) or K880 by Info-Gel, LLC (North Carolina, USA) may be used.

The skilled person will appreciate that any combination of the features of the above described variants may be conceivably provided in a cable according to the present invention.

The optical module 1 may be used a such as a finished cable, when the intended operating conditions allow to do so. In the example of FIGS. 1, 1*a* the retaining element 15 can operate directly as outer sheath of the cable. Accordingly, also the sheath may comprise two first longitudinally extending portions made of a first, higher fracture toughness material and two second longitudinally extending portions made of a second, lower fracture toughness material in order to facilitate the access to the underlying optical modules.

Alternatively, a plurality of modules can be arranged together, in a multi-module cable construction, when a high fiber count cable is required.

Figure 2:
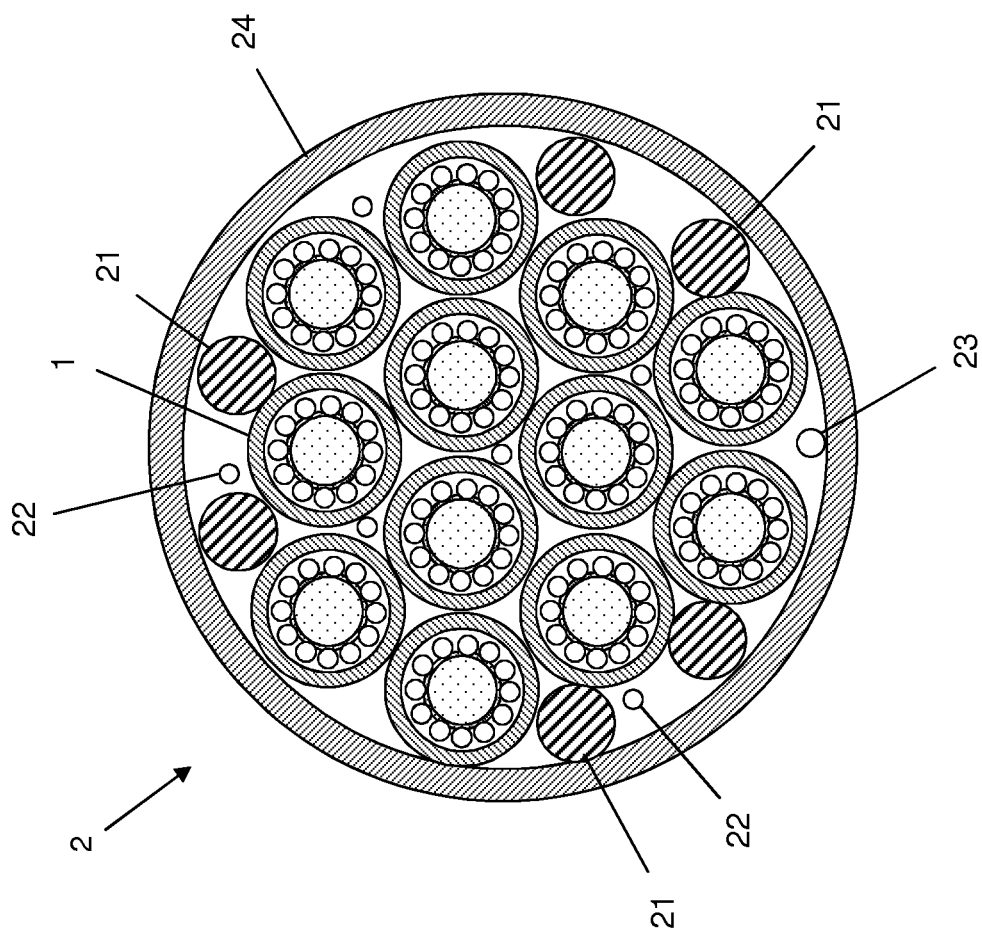
FIG. 2 shows a cable comprising a plurality of optical modules according to an alternative embodiment of the present invention.

FIG. 2 shows a cable 2 according to the present invention, comprising a group of optical modules 1 and an outer sheath 24. According to an example, the cable 2 of FIG. 2 comprises twelve optical modules 1, each comprising twelve optical fibers 13. In this way, a fiber count of 144 is achieved. The outer sheath 24 is preferably made of polyethylene (PE). Other materials which may be employed for the outer sheath are: polypropylene (PP), polyamide (PA), low smoke zero halogen (LSOH) fire retardant material (e.g. as disclosed in EP 1 043 733 or EP 1 116 244). The thickness of the outer sheath 24 is preferably comprised between 0.1 mm and 3.0 mm. More preferably, the thickness of the outer sheath 24 is equal to 0.2 mm.

The cable 2 preferably further comprises a number of interstitial fillers 21 which allow making the optical core of the cable rounder for sheathing. The interstitial fillers 21 may be made of glass reinforced plastic (GRP) and may be coated by a layer of a quasi-solid coating of superabsorbent polymers (SAP) (e.g. extruded materials that utilize sodium polyacrylate which has water-blocking properties). Each interstitial filler 21 may have a diameter equal to 0.84 mm. The cable 2 of FIG. 2 comprises six interstitial fillers 21.

Moreover, the cable 2 preferably comprises a dry water blocking material 22 in the interstitial spaces between the optical modules 1 and the outer sheath 24. The water blocking material is preferably a water swellable material (e.g. polyacrylate). The water-blocking material may be in the form of powder, gel, tapes or impregnated yarns. The cable 2 of FIG. 2, for sake of example, comprises six water swellable yarns 22.

Further, the cable 2 may comprise a number of ripcords 23. This number may range from 1 to 4. The cable 2 of FIG. 2 comprises one ripcord 23. Ripcords aid stripping at cable termination or during a mid-span breakout.

Figure 4:
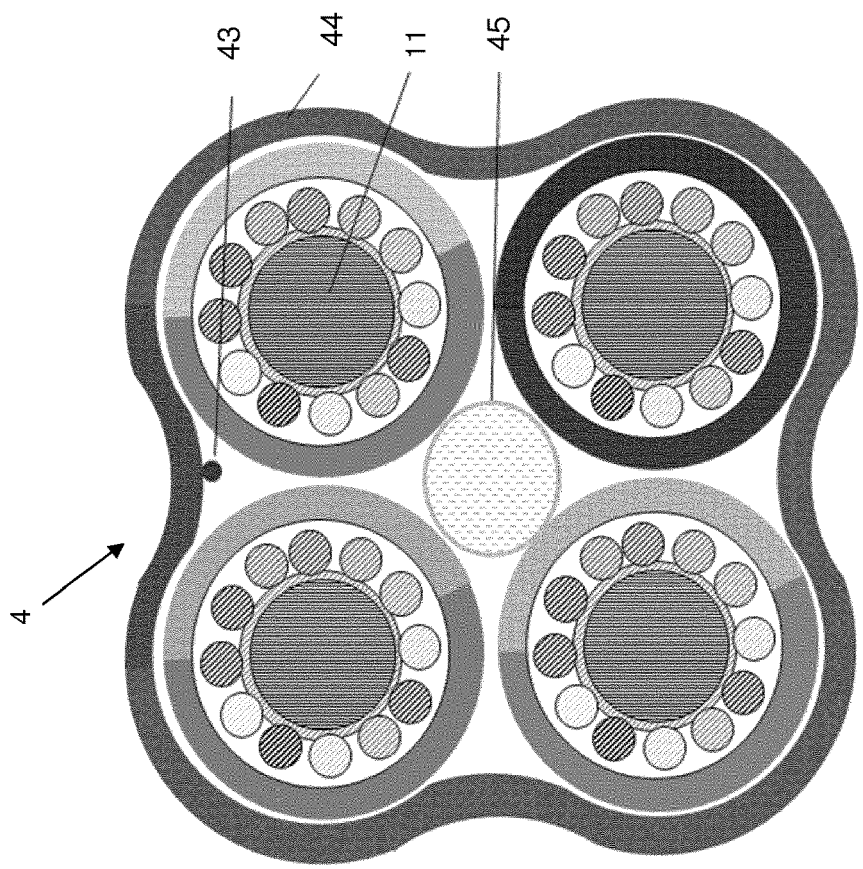
FIG. 4 shows a cable comprising four optical modules according to an embodiment of the present invention.
Figure 3:
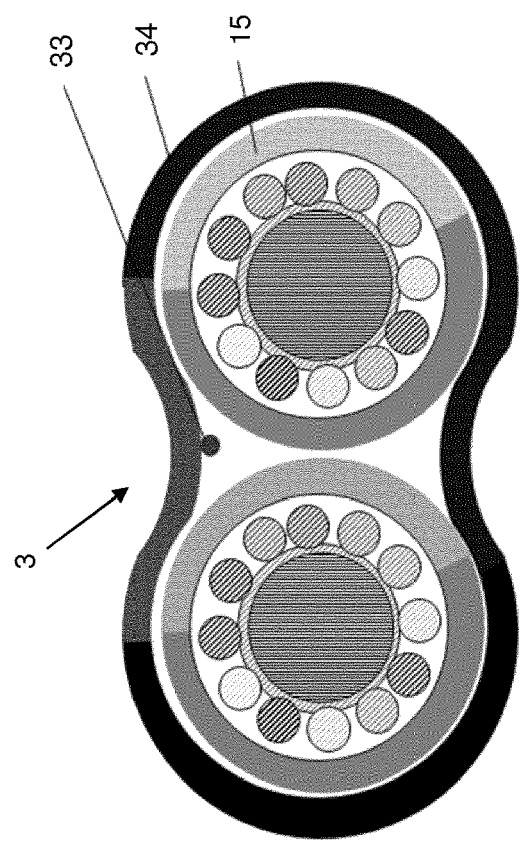
FIG. 3 shows a cable comprising two optical modules according to an embodiment of the present invention.

FIGS. 3 and 4 show two variants of the cable of the present invention according to which respectively two and four optical modules described above are grouped together within a sheath. FIG. 3 shows a first cable variant 3 comprising two optical modules and FIG. 4 shows a second cable variant 4 comprising four optical modules. In both cables 3, 4, an outer sheath 34, 44 may be applied over the optical modules 1. Further, each cable 3, 4 may comprise other elements such as ripcords 33, 43 and/or additional strength members 45 and/or water blocking materials (not shown in FIGS. 3 and 4).

The use of the optical modules described above advantageously results in optical cables with a reduced diameter, which is a particularly desirable requirement especially in FTTX applications.

For instance, a fiber count of 144 may be achieved using 12 optical modules, each module including 12 optical fibers. According to the invention, if the external diameter of each optical module is 1.65 mm, the diameter of the optical core is 6.8 mm and the cable diameter is 7.2 mm, assuming that the thickness of the retaining element is 0.2 mm. A same fiber count of 144 may be instead achieved using a known MLT cable with 12 buffering tubes comprising 12 optical fibers each. If the external diameter of each buffering tube is 1.65 mm, the diameter of the central strength member is 5.25 mm and the outer sheath has a thickness of 0.2 mm, the cable diameter is 8.95 mm. Hence, according to the present invention, the cable diameter is reduced by about 20% with respect to a known MLT cable with a same fiber count.

Hence, a substantial cable diameter reduction is advantageously achieved.

Moreover, the inventors noticed that the cable according to the present invention also provides an improved tensile strength.

Indeed, in cable 2 of FIG. 2, provided that the six interstitial fillers 21 and the twelve strength members 11 of the optical modules 1 are made of GRP, the total cross section of GRP is:

$$6 \times \pi \times (0.84/2)^2 + 12 \times \pi \times (0.75/2)^2 = 3.33 + 5.3 \text{ mm}^2 = 8.63 \text{ mm}^2$$

provided that the diameter of each interstitial filler 21 is equal to 0.84 mm and the diameter of each strength member 11 is equal to 0.75 mm.

In the MLT cable with twelve buffering tubes used for comparison, assuming that the GRP central strength member has a thickness of 2 mm, the total cross section of GRP is 3.14 mm².

Therefore, the cable 2 according to the present invention contains about 270% of the GRP strength of the MLT cable used for comparison, and hence achieves a substantially improved tensile strength.

In light of the above, a cable according to the present invention advantageously has a smaller diameter than a MLT cable comprising buffering tubes having the same size as the optical modules of the present invention. Moreover, such a cable has higher tensile strength and better environmental performances (according to the standard IEC 60794-1-22) than the MLT cable.

Due to the size reduction, the cable according to the present invention has a lower weight than a MLT cable, has a longer installation length and reduced environmental impact. Moreover, a cable according to the present invention, in which the optical modules have independent strength members of appropriate size, maintains a consistent shape which does not impair fiber signal attenuation when stored in a loop at the product termination or at mid-span connectivity joints. The size of the strength member of the optical module is appropriate to ensure an effective operation over the required lifetime of the cable without static fatigue. Indeed, if the optical module is to be stored in loops with a radius of 40 mm, then typically the maximum diameter of the GRP would be 40 mm/50=0.8 mm. Therefore, according to the present invention, with a strength member having a preferred diameter of 0.75 mm, the optical module advantageously would not suffer from stress fatigue during long term storage.

The reduced size of the GRP strength members also provide compliance with module kink testing as described by IEC 60794-1-23 method G1, as it will be described herein below. In this test, the inventors looped a 350 mm sample of the optical module between two fixed points 100 mm apart. The loop size has been then reduced by pulling a length (e.g. 60 mm) of the optical module though one of the fixed points. The inventors noticed that in this situation the loop radius would be reduced to approximately 46 mm. This accordingly would limit the GRP size to 0.92 mm. If a harsher limit is applied, i.e. a longer length (e.g. 80 mm) of optical module is pulled through the fixed point, then the result radius is 43 mm, limiting the GRP size to 0.86 mm. Hence, the inventors demonstrated that optical modules with GRP with a diameter less than 0.85 mm meet test and practical installation requirements.

The optical module according to the present invention also provides for reducing complexity and, accordingly, costs of the connectivity equipment. As mentioned above, optical modules in the form of tubes (e.g. PBT tubes) have reduced bend or tensile strength and hence they are bend managed within a connectivity equipment (e.g. underground joint, termination rack) using capstans, pulleys, transport tubes and curved surfaces. According to the present invention, the transport tube is no more required when using the optical modules of FIG. 1.

The optical module 1 may be manufactured as described in detail hereinafter with reference to FIG. 10.

Finally, the use of the optical modules according to the present invention allows providing an alternative advantageous cable design that will be described in the following with reference to FIGS. 5a, 5b, 6a and 6b.

FIG. 5a shows a cable 5 which is similar to cable 2 of FIG. 2 in that it comprises twelve optical modules 1 and other elements such as water blocking materials, ripcords and an outer sheath 54. However, in cable 5, the outer sheath 54 has a shape 57 that mimics the interstitial space around the optical core. Indeed, the geometry of the optical core of a cable comprising the optical modules 1 according to the present invention is a triangular bunch, as also evident from FIG. 2. Therefore, the shape 57 of the outer sheath 54 of cable 5 "supports" the optical core. The cable 5 also preferably comprises one or more peripheral strength members 56 which are embedded into the outer sheath 54. The cable 5 comprises, for sake of example, six peripheral strength members 56. A sheath cut identification 58 may be located in correspondence of a portion of the outer sheath which is free of embedded peripheral strength members, in order to ease removal of the sheath.

FIGS. 6a and 6b show a similar cable design with four optical modules 1.

The cable designs of FIGS. 5a and 6a advantageously allow increasing the cable mechanical and environmental performances. Moreover, advantageously, the peripheral strength members may act as optical core armour.

Furthermore, according to these alternative cable designs, the outer sheath of the cable may advantageously contain peripheral strength members whose size, position and Young's modulus may be modified to give the cable directional preference bend stiffness which is helpful in directing the cable about route bends. For instance, to cause preferential bend stiffness in a cable with four optical modules as the one of FIG. 6a, two diametrically opposing peripheral strength members may be made from a large Young's modulus material (e.g. aramid yarns, having a Young's modulus of 107 MPa) and other two opposing peripheral strength members, perpendicular to the former two, may be made from a small Young's modulus material (e.g. GRP, having a Young's modulus of 50 MPa).

This is particularly advantageous when installation techniques such as rodding (i.e. the cable is pushed into and along a prepared sub-duct) are to be used. The cables according to the present invention advantageously have compressive stiffness to promote cable rodding, while still being flexible enough to flex about route bends. These mechanical features are also advantageous in optimizing the push load at the start of a blown installation.

The optical modules described above may be advantageously used also in other cable constructions, as it will be described in detail herein after with reference to FIGS. 7 to 9.

Figure 7:
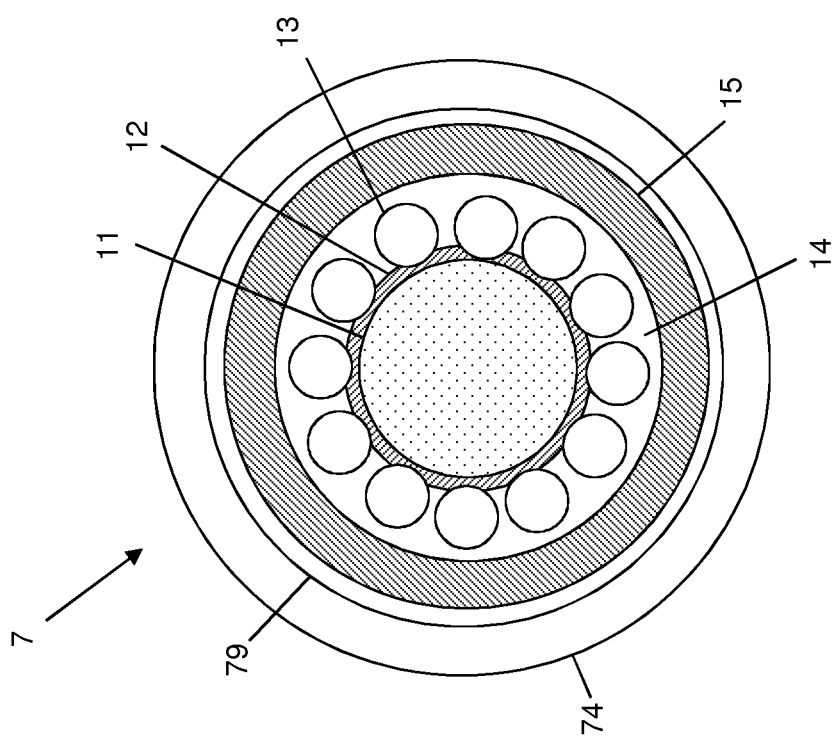
FIG. 7 shows a cable comprising an optical module according to an embodiment of the present invention.

By way of example, FIG. 7 shows a cable 7 comprising the optical module 1 shown in FIG. 1 according to the invention. In addition to the optical module 1, the cable 7 comprises a layer of aramid yarns 79 arranged externally to the retaining element 15 of the optical module 1. The cable 7 also preferably comprises an outer sheath 74 arranged externally to the layer of aramid yarns 79. The outer sheath 74 is preferably made of a low smoke zero halogen fire retardant material (e.g. as disclosed in EP 1 043 733 or EP 1 116 244). Optionally, side strength elements (e.g. steel members) may be embedded within the thickness of outer sheath 74.

Figure 8:
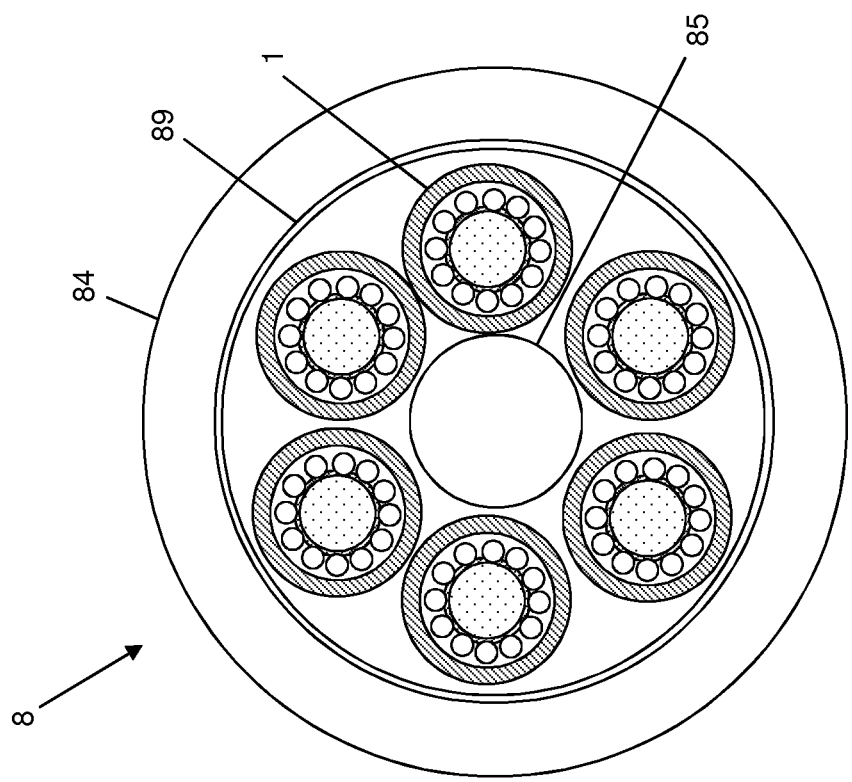
FIG. 8 shows a cable comprising optical modules according to an embodiment of the present invention.

FIG. 8 shows a cable 8 comprising a plurality of optical modules similar to the optical module 1 shown in FIG. 1 according to the invention.

According to an example, the cable 8 shown in FIG. 8 comprises six optical modules 1. Each optical module 1 has a structure similar to that shown in FIG. 1 and described above. Hence, a detailed description will not be repeated. The optical modules 1 are preferably arranged according to an open helix (or "S-Z") pattern about the longitudinal axis of the cable 8.

In order to allow identification of each single fiber of the cable 8, the outermost retaining element of each optical module 1 comprised within the cable 8 has a respective color. Hence, each single optical fiber of the cable 8 is preferably identified by a combination of the color of the outermost retaining element of the optical module 1 in which the fiber is comprised, and the fiber color as defined e.g. by the above mentioned international standard ANSI/EIA/TIA-598 "Optical Fiber Color Coding".

In addition to the optical modules 1, the cable 8 preferably comprises a binder 89 surrounding the optical modules 1. The binder 89 preferably comprises a wrapping tape (e.g. an EFFEGIDI International Cavilen 19 micron polyester tape, bound with Roblon low shrink polyester 1670 dtex water swelling binders). The cable 8 also preferably comprises an outer sheath 84 arranged externally to the binder 89. The outer sheath 84 is preferably made of a high density polyethylene (e.g. Bi modal high density polyethylene Borealis Borstar® HE6062). The cable 8 also preferably comprises a central strength member 85, about which the optical modules 1 are wound. Optionally, side strength elements (e.g. steel members, not shown in FIG. 8) may be embedded within the thickness of the outer sheath 84.

Figure 9:
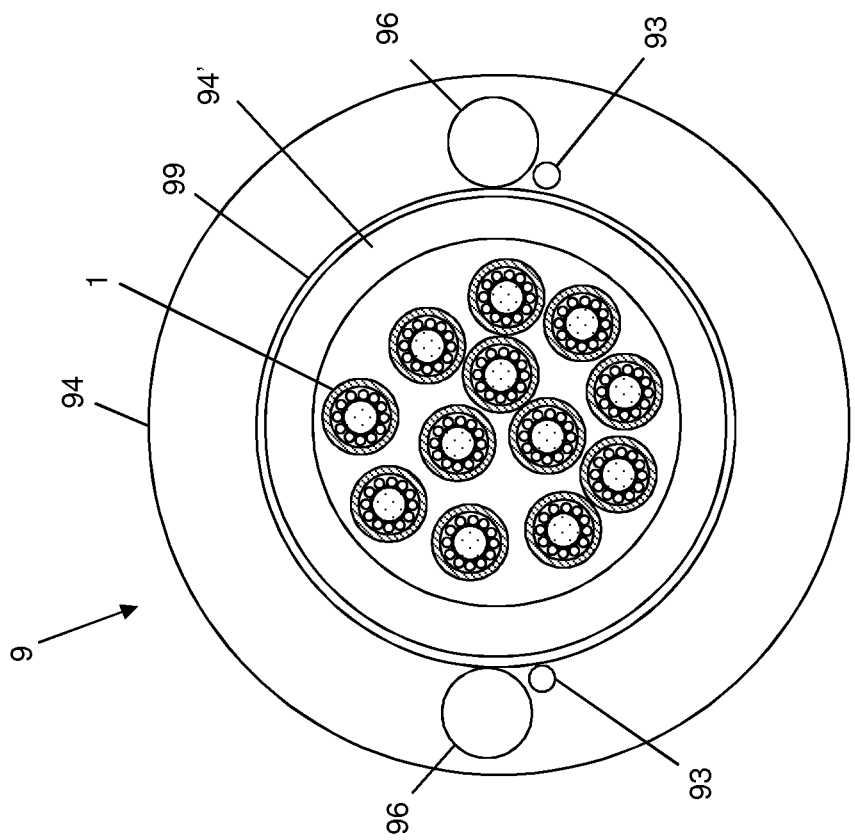
FIG. 9 shows a cable comprising optical modules according to an embodiment of the present invention.

FIG. 9 shows a cable 9 comprising a plurality of optical modules similar to the optical module 1 shown in FIG. 1.

According to an example, the cable 9 shown in FIG. 9 comprises twelve optical modules 1. Each optical module 1 has a structure similar to that shown in FIG. 1 and described above. Hence, a detailed description will not be repeated. The cable 9 has accordingly a fiber count of 24×12=288. The optical modules 1 are preferably arranged according to an open helix (or "S-Z") pattern about the longitudinal axis of the cable 9.

In order to allow identification of each single fiber of the cable 9, the outermost retaining element of each optical module 1 comprised within the cable 9 has a respective color. Hence, each single optical fiber of the cable is preferably identified by a combination of the color of the outermost retaining element of the optical module 1 in which the fiber is comprised, and the fiber color as defined e.g. by the above mentioned international standard ANSI/EIA/TIA-598 "Optical Fiber Color Coding".

In addition to the optical modules 1, the cable 9 preferably comprises an inner tube 94' surrounding the optical modules 1. The inner tube 94' is preferably made of a polyethylene (e.g. Bi modal high density polyethylene Borealis Borstar® HE6062 or low shrink Borealis Borstar® HE6068). The cable 9 also preferably comprises a binder 99 surrounding the inner tube 94'. The binder 99 preferably comprises a wrapping tape. The cable 9 also preferably comprises an outer sheath 94 arranged externally to the binder 99. The outer sheath 94 is preferably made of high density polyethylene (e.g. high density polyethylene Borealis Borstar® HE6062). The cable 9 also preferably comprises side strength elements (e.g. steel members) 96 embedded within the thickness of outer sheath 94. Ripcords 93 are also preferably embedded within the thickness of the outer sheath 94.

The use of the optical modules of the present invention in cables such as those described above, advantageously improves the mechanical performance of the cable, in terms of tensile strength, crush resistance, minimum crush load and minimum bend radius. In particular, as known, a limit for the crush performance of a cable is signal attenuation due to macro bending which may occur when the optical fibers in a loose tube physically cross over. Advantageously, according to the present invention, in the optical module 1 the optical fibres do not overlap. Therefore, the crush resistance of the cable improves and the minimum crush load increases.

Figure 10:
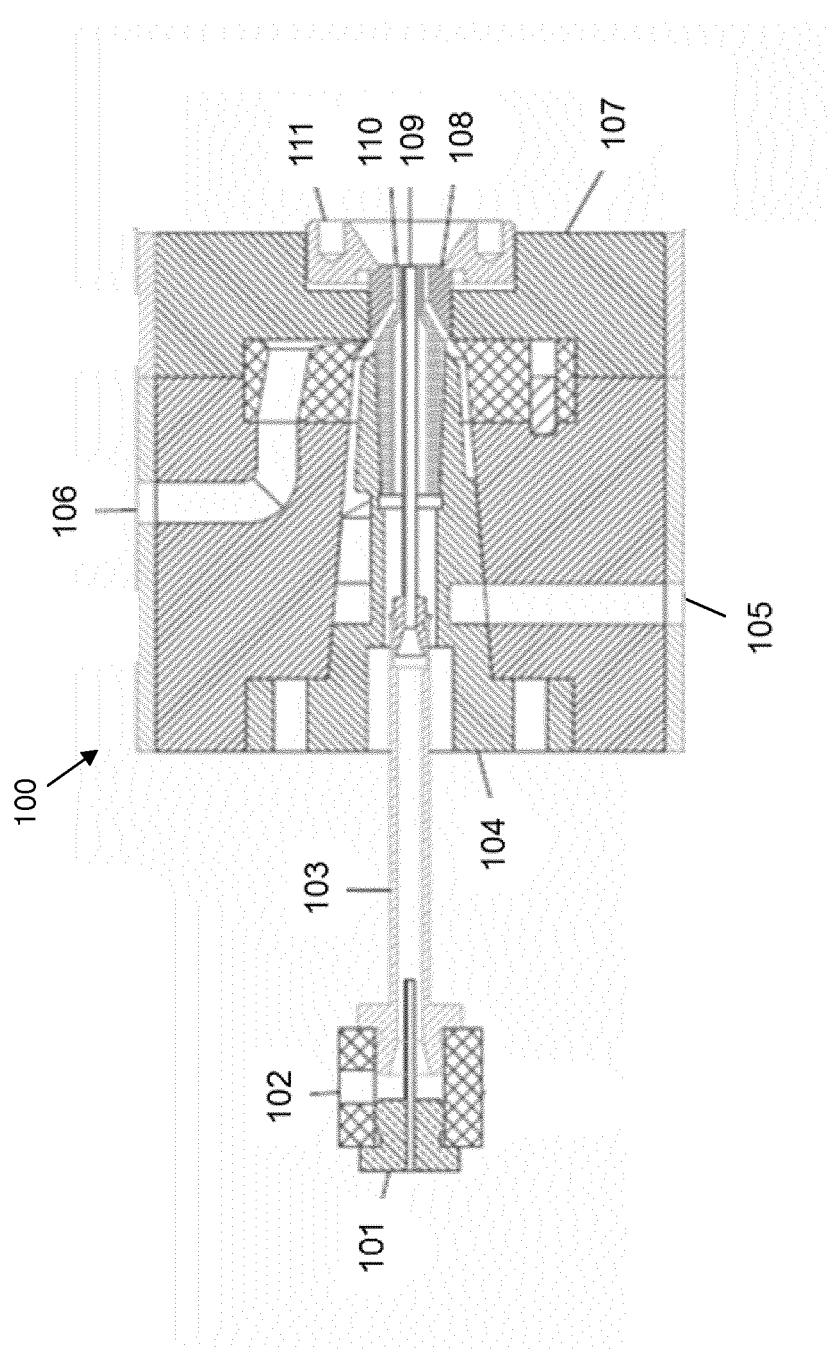
FIG. 10 schematically shows an equipment for manufacturing an optical module according to an embodiment of the present invention.

With reference to FIG. 10, an apparatus 100 and process for manufacturing the optical module 1 according to an embodiment of the present invention will be described in detail.

In particular, the apparatus 100 preferably comprises a fiber guide 101, a grease port 102, a grease body 103, a cartridge 104, a primary extruder port 105, an auxiliary extruder port 106 (optional), an extruder head die body 107, a die 108, a grease tip 109, a core tube 110 and a die nut 111. The fiber guide 101 is preferably configured to support the fibers 13 to be incorporated in the optical module 1. The grease port 102 is the inlet of the grease that may fill the interstitial space between the strength member 11 and the retaining element 15. The grease body 103 is configured to support the grease tip 109 in its correct position, the grease tip 109 being in turn configured to supply the grease that will fill the interstitial space. The cartridge (or "flow tube") 104 is configured to hold the core tube 110 in its correct position while allowing the polymer provided by the primary extruder port 105 flowing along the head into the void between the core tube 110 and die 108. The primary extruder port 105 is configured to supply the polymer forming the retaining element 15 to the core tube 110. The auxiliary extruder port 106 is configured to supply a further polymer (optional) to the core tube 110 (e.g. for forming a colored strip along the retaining element 15 or for improving the extrusion properties). The extruder head die body 107 is configured to support die 108 and die nut 111. The die 108 (retained by a die nut 111) and core tube 110 are configured to define an annular void space through which the extruded polymer flows thereby forming the retaining element 15.

Advantageously, the extrusion line of the apparatus 100 comprises a fiber guide 101 provided with a continuous small bore guide, which ensures that fibers 13 are bunched about the strength member 11 over the whole length of the fiber guide 101. Such bore guide preferably has an inside diameter of 2.690 mm and an outside diameter of 3.505 mm. Furthermore, as to the grease tip 109, its internal diameter preferably approximates the final required injected package of 2.7 mm (the internal diameter of the grease tip 109 is instead usually slightly larger—about 20%—than the internal diameter of the fiber guide 101, in order to ensure forward flow of the grease).

The process for manufacturing the optical module 1 using the apparatus 100 will be now described in detail.

Within the apparatus 100 the strength member 11 (optionally coated with the coating 12) is firstly passed through the fiber guide 101. The optical fibers 13 are preferably oscillated about the strength member 11 and are gathered at the fiber guide 101. Then, the strength member 11 (with fibers 13 arranged about it) is passed though the grease tip 109, which injects the filling compound in the interstitial spaces amongst the fibers 13. The collection of strength member 11, fibers 13 and filling compound is then fed to the extruding tool comprising core tube 110 and die 108, which extrude the retaining element 15 upon the fibers 13.

The invention claimed is:

1. An optical cable comprising an optical module, said optical module comprising:
 a strength member;
 a plurality of optical fibers arranged about said strength member, said optical fibers being arranged substantially on a circumference concentric with said strength member; and
 a retaining element arranged about said plurality of optical fibers,
 wherein said retaining element is a coaxial tube arranged externally to the strength member and comprises two first longitudinally extending portions made of a first, higher fracture toughness material and two second longitudinally extending portions made of a second, lower fracture toughness material, each one of the first portions and second portions having a transversal cross-section in a shape of a sector of annulus.

2. The optical cable according to claim 1, wherein said strength member is a rod made of a glass reinforced plastic.

3. The optical cable according to claim 2, wherein said rod is made of a glass reinforced plastic having a Young's modulus between 25 MPa and 125 MPa.

4. The optical cable according to claim 1, wherein said strength member has a diameter between 0.55 mm and 0.95 mm.

5. The optical cable according to claim 4, wherein said strength member has a diameter of 0.75 mm.

6. The optical cable according to claim 1, wherein the retaining element is made of a single polymeric material selected from the group comprising: polybutylene terephthalate, polypropylene, polyethylene, polyamide, polycarbonate, acrylonitrile butadiene styrene, thermoplastic elastomers, ethylene vinyl acetate, and UV cured acrylics.

7. The optical cable according to claim 1, wherein an outside diameter of the retaining element is between 0.6 mm and 2.2 mm.

8. The optical cable according to claim 1, wherein said fibers are arranged side by side on said circumference, with no reciprocal overlapping.

9. The optical cable according to claim 1, wherein said optical module further comprises a coating arranged on an inside surface of said retaining element.

10. The optical cable according to claim 1, wherein said optical module further comprises, in an interstitial space between the strength member and the retaining element, a water blocking material and/or a buffering grease.

11. The optical cable according to claim 1, wherein said strength member is covered by a coating made of a water swellable material.

12. The optical cable according to claim 11, wherein said coating is made of an ethylene vinyl acetate copolymer.

13. A process for manufacturing an optical cable comprising a group of optical modules, the process comprising:
 stranding a plurality of optical fibers around a strength member, the strength member being covered by a coating;
 covering the plurality of optical fibers with a retaining element, thereby forming an optical module; and
 housing two or more optical modules within an outer sheath,
 wherein said manufactured optical cable does not have a central strength member,
 wherein each of said optical modules further comprises a coating of a water swellable material arranged on an inside surface of said retaining element, and
 wherein said retaining element is a coaxial tube arranged externally to the strength member and comprises two first longitudinally extending portions made of a first, higher fracture toughness material and two second longitudinally extending portions made of a second, lower fracture toughness material, each one of the first portions and second portions having a transversal cross-section in a shape of a sector of annulus.

14. An optical cable comprising a group of optical modules, each of said optical modules comprising:
   a strength member covered by a coating;
   a plurality of optical fibers arranged about said strength member, said optical fibers being arranged substantially on a circumference concentric with said strength member, wherein said optical fibers are at least partly embedded within said coating; and
   a retaining element arranged about said plurality of optical fibers,
   wherein said optical cable comprises an outer sheath around the group of optical modules,
   wherein said optical cable does not have a central strength member, and
   wherein said retaining element is a coaxial tube arranged externally to the strength member and comprises two first longitudinally extending portions made of a first, higher fracture toughness material and two second longitudinally extending portions made of a second, lower fracture toughness material, each one of the first portions and second portions having a transversal cross-section in a shape of a sector of annulus.

15. The optical cable according to claim 14, wherein said coating is made of a water swellable material or an EVA copolymer.

16. The optical cable according to claim 14, wherein said coating is made of a thermoplastic resin material.

17. The optical cable according to claim 14, wherein said fibers are arranged side by side on said circumference, with no reciprocal overlapping.

* * * * *